Patented Aug. 10, 1926.

1,595,506

UNITED STATES PATENT OFFICE.

CAMILLE DREYFUS, OF LONDON, ENGLAND, ASSIGNOR TO THE AMERICAN CELLULOSE & CHEMICAL MANUFACTURING COMPANY LTD., OF NEW YORK, N. Y.

MANUFACTURE OF PRESSED OR MOLDED ARTICLES FROM COMPOSITIONS CONTAINING CELLULOSE DERIVATIVES.

No Drawing. Application filed December 27, 1923, Serial No. 683,071, and in Great Britain February 14, 1923.

This invention relates to the manufacture of pressed or molded articles from compositions having a basis of cellulose acetate or cellulose esters of other organic acids, or cellulose ethers, all of which are hereinafter referred to as organic derivatives of cellulose.

The term "pressed or molded articles" is to be understood in a wide sense, to include any articles or objects produced by pressing under heat, whether in or upon molds or matrices, with or without employment of cores or reinforcements, or on to supports, carriers or backings or into or between sheets or reinforcements of paper, cardboard, wood or other material, or by extrusion through dies or in any other manner.

The invention may be applied with particular advantage for the manufacture of gramophone or phonograph records, electrical articles such as switchboards, distributor heads for motor car ignition systems, and so forth, but is also applicable for the manufacture of molded articles and objects in general.

The invention is particularly applicable for the production of pressed or molded articles having a basis of cellulose acetate, and will be particularly described in relation to cellulose acetate, but cellulose esters of other organic acids, or cellulose ethers, or mixtures of any of such esters or ethers, may be employed wholly or partly instead of cellulose acetate.

According to the invention the celluolse derivative or derivatives, in particular cellulose acetate, is melted together with one or more plasticizing agents (which term includes any known or suitable plasticizing agents, high boiling solvents or camphor substitutes) in a pot or in other suitable way, with or without addition of resin or resins for example acaroid resin, rosin, shellac, copal or others and with or without other desired additions, such for example as dyes, pigments, inflammability reducing agents, stabilizers, or in some cases filling materials, and after the melted mass has been allowed to solidify, preferably by running it into sheets, slabs or other convenient form, it is ground to powder, and the powder, either directly or after working up on heated rolls with or without powdered filling materials, dyes, pigments, inflammability reducing agents, stabilizers or other desired additions, is pressed under heat in molds or matrices, or through dies, or on to or between carriers, backings or the like, or otherwise, to form articles or objects of any kind.

In the case of some desired additions, as for example dyes, inflammability reducing agents such as triphenyl or tricresyl phosphate, stabilizers such as alkyl or aryl urea derivatives etc., these may be made to the cellulose derivative containing mixture before the melting, but in the case of additions such as filling materials, which are usually added in substantial proportions, these should preferably be incorporated or mainly incorporated after the melting and grinding.

If the melted material is too soft to permit of easy grinding, pulverulent filling material may be added to it until a sample shows that it can be easily ground.

The following are some examples of the practical employment of the invention, applicable more especially for making gramophone or phonograph records and other pressed or molded articles, it being understood that these examples are given only by way of illustration and that the ingredients and proportions can be varied widely according to the articles to be made, the degree of softness required in the finished article or other requirements, without departing from the invention.

*Example 1.*

100 parts of cellulose acetate in powder are mixed with about 45–55 parts of paratoluene sulphonamide or other plasticizing agent and the mixture is melted together in a heated pot. The molten mass is then run into slabs or sheets which are ground to powder and mixed with about 180–200 parts of powdered filling material, for instance a mixture of lampblack, red oxide of iron and barytes. The mixture of ground material and filling material, preferably after working up or kneading on heated rolls, can be molded or pressed under heat into matrices or molds to form gramophone or phonograph records or other molded or pressed articles. In making gramophone or phonograph records or other articles, sheets of paper, cardboard or other reinforcements may, of course, be embodied in or united with the article in the pressing or molding operation in the known way.

Example 2.

100 parts of cellulose acetate in powder, about 45–50 parts of triacetin, or mixed isomeric xylene mono methyl sulphonamides or other liquid high boiling alkylated xylene-, toluene- or benzene sulphonamide derivative or preparation such as specified in British Patents 132,283, 133,353 or 154,334, and about 6–10 parts of triphenyl phosphate are melted together in a pot and afterwards run into sheets or slabs for solidifying and then ground to powder, which may be further worked up to molded or pressed articles in a similar manner to that described in Example 1.

Example 3.

100 parts of cellulose acetate is powder, about 80 parts of rosin and about 70 parts of para toluene sulphonamide or a liquid high boiling alkylated xylene-, toluene- or benzene sulphonamide derivative or preparation such as specified in British Patents 132,382, 133,353 or 154,334 are melted together, with or without addition of a small quantity of one or more substances such as stabilizers (e. g. urea or alkyl or aryl urea derivatives), triphenyl phosphate, dyes, pigments or other effect materials, or filling materials, and the melt after cooling and solidifying is ground to powder, which can be further worked up to molded or pressed articles in a similar way to what is described in Example 1.

What I claim and desire to secure by Letters Patent is:—

1. Process for the manufacture of molded articles, comprising melting a mixture comprising an organic derivative of cellulose and a plasticizing agent, allowing the melted mass to solidify, pulverizing same, and pressing under heat to required form.

2. Process for the manufacture of molded articles, comprising melting a mixture comprising an organic derivative of cellulose and a plasticizing agent, allowing the melted mass to solidify, pulverizing same, working up the powdered material on heated rolls, and pressing under heat to required form.

3. Process for the manufacture of molded articles, comprising melting a mixture comprising an organic derivative of cellulose, a plasticizing agent and a resin, allowing the melted mass to solidify, pulverizing same, and pressing under heat to required form.

4. Process for the manufacture of molded articles, comprising melting a mixture comprising an organic derivative of cellulose, a plasticizing agent and a resin, allowing the melted mass to solidify, pulverizing same, working up the powdered material on heated rolls, and pressing under heat to required form.

5. Process for the manufacture of molded articles, comprising melting a mixture comprising an organic derivative of cellulose, a plasticizing agent and an inflammability reducing agent, allowing the melted mass to solidify, pulverizing same, and pressing under heat to required form.

6. Process for the manufacture of molded articles, comprising melting a mixture comprising an organic derivative of cellulose, a plasticizing agent and an inflammability reducing agent, allowing the melted mass to solidify, pulverizing same, working up the powdered material on heated rolls, and pressing to required form.

7. Process for the manufacture of molded articles, comprising melting a mixture comprising an organic derivative of cellulose, a plasticizing agent and a stabilizer, allowing the melted mass to solidify, pulverizing same and pressing under heat to required form.

8. Process for the manufacture of molded articles, comprising melting a mixture comprising an organic derivative of cellulose, a plasticizing agent and a stablizer, allowing the melted mass to solidify, pulverizing same, working up the powdered material on heated rolls, and pressing under heat to required form.

9. Process for the manufacture of molded articles comprising melting a mixture comprising an organic derivative of cellulose and a plasticizing agent, allowing the melted mass to solidify, pulverizing same, incorporating filling material with the powdered material, and pressing under heat to required form.

10. Process for the manufacture of molded articles, comprising melting a mixture comprising an organic derivative of cellulose and a plasticizing agent, allowing the melted mass to solidify, pulverizing same, incorporating filling material with the powdered material, working up the mixture on heated rolls and pressing under heat to required form.

11. Process for the manufacture of molded articles, comprising melting a mixture comprising an organic derivative of cellulose, a plasticizing agent and a resin, allowing the melted mass to solidify, pulverizing same, incorporating filling material with the powdered material, and pressing under heat to required form.

12. Process for the manufacture of molded articles, comprising melting a mixture comprising an organic derivative of cellulose, a plasticizing agent and a resin, allowing the melted mass to solidify, pulverizing same, incorporating filling material with the powdered material, working up the mixture on heated rolls, and pressing under heat to required form.

13. In a process for the manufacture of molded articles, the steps of mixing and melting together ingredients comprising an organic derivative of cellulose and a plasticizing agent, allowing the mass to solidify and pulverizing same.

14. In a process for the manufacture of molded articles, the steps of mixing and melting together ingredients comprising an organic derivative of cellulose and a plasticizing agent, allowing the melted mass to solidify, pulverizing same, and working up the powdered material on heated rolls.

15. In a process for the manufacture of molded articles, the steps of mixing and melting together ingredients comprising an organic derivative of cellulose and a plasticizing agent, allowing the melted mass to solidify, pulverizing same and incorporating filling material with the powdered material.

16. In a process for the manufacture of molded articles, the steps of mixing and melting together ingredients comprising an organic derivative of cellulose and a plasticizing agent, allowing the melted mass to solidify, pulverizing same, and incorporating filling material with the powdered material and working up the mixture on heated rolls.

17. In a process for the manufacture of molded articles, the steps of mixing and melting together ingredients comprising an organic derivative of cellulose, a plasticizing agent and a resin, allowing the melted mass to solidify and pulverizing same.

18. In a process for the manufacture of molded articles, the steps of mixing and melting together ingredients comprising an organic derivative of cellulose, a plasticizing agent and a resin, allowing the melted mass to solidify, pulverizing same and working up the powdered material on heated rolls.

19. In a process for the manufacture of molded articles, the steps of mixing and melting together ingredients comprising an organic derivative of cellulose, a plasticizing agent and a resin, allowing the melted mass to solidify, pulverizing same and incorporating filling material with the powdered material.

20. In a process for the manufacture of molded articles, the steps of mixing and melting together ingredients comprising an organic derivative of cellulose, a plasticizing agent and a resin, allowing the melted mass to solidify, pulverizing same and incorporating filling material with the powdered material and working up the mixture on heated rolls.

21. Process for the manufacture of molded articles comprising melting a mixture comprising cellulose acetate and a plasticizing agent, allowing the melted mass to solidify, pulverizing the same, and pressing under heat to required form.

22. Process for the manufacture of molded articles, comprising melting a mixture comprising cellulose acetate and a plasticizing agent, allowing the melted mass to solidify, pulverizing same, working up the powdered material on heated rolls, and pressing under heat to required form.

In testimony whereof I have hereunto subscribed my name.

CAMILLE DREYFUS.